United States Patent [19]

Männer

[11] Patent Number: 4,925,384
[45] Date of Patent: May 15, 1990

[54] APPARATUS FOR ADMITTING HARDENABLE MATERIAL INTO THE DIES OF MOLDING MACHINES

[76] Inventor: Otto Männer, Reetzestrasse 2, D-7836 Bahlingen, Fed. Rep. of Germany

[21] Appl. No.: 341,128

[22] Filed: Apr. 20, 1989

[30] Foreign Application Priority Data

Dec. 21, 1988 [DE] Fed. Rep. of Germany ....... 3843035

[51] Int. Cl.$^5$ .................................. B29C 45/23
[52] U.S. Cl. ........................ 425/564; 264/328.9; 264/328.15; 425/566
[58] Field of Search ............. 264/328.9, 328.15; 425/562, 564, 565, 566

[56] References Cited

U.S. PATENT DOCUMENTS

| 4,268,240 | 5/1981 | Rees et al. | 425/566 |
| 4,412,807 | 11/1983 | York | 425/564 |

FOREIGN PATENT DOCUMENTS 3245571  6/1984  Fed. Rep. of Germany .

Primary Examiner—Jay H. Woo
Assistant Examiner—Timothy W. Heitbrink
Attorney, Agent, or Firm—Peter K. Kontler

[57] ABSTRACT

A valve which serves to admit hardenable metallic, plastic or other material into the die of a molding machine has a housing with a centrally located passage for a reciprocable needle-like valving element, an inlet for hardenable material at one side and adjacent one end of the passage, an outlet which is coaxial with the other end of the passage, an eccentric chamber disposed at the one side of the passage and communicating with the inlet, and an elongated gap which establishes communication between the chamber and the passage. The valving element is movable between an extended position in which it seals the gap from the outlet and a retracted position in which the gap admits hardenable material into the passage so that the admitted material can flow toward and through the outlet. The housing surrounds the valving element in the region of the gap along an arc of more than 180°.

13 Claims, 1 Drawing Sheet

U.S. Patent   May 15, 1990   4,925,384
Fig. 1
Fig. 2
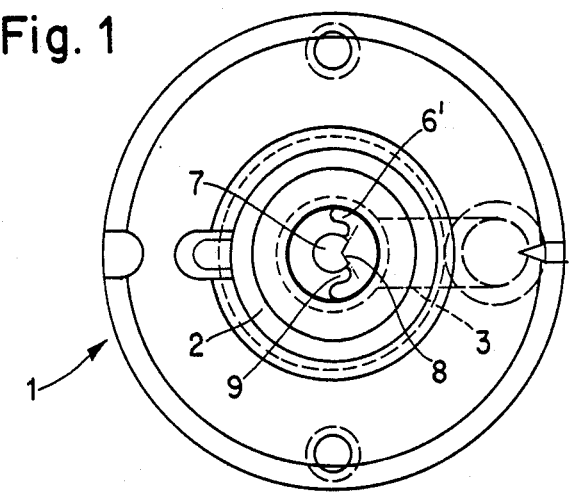
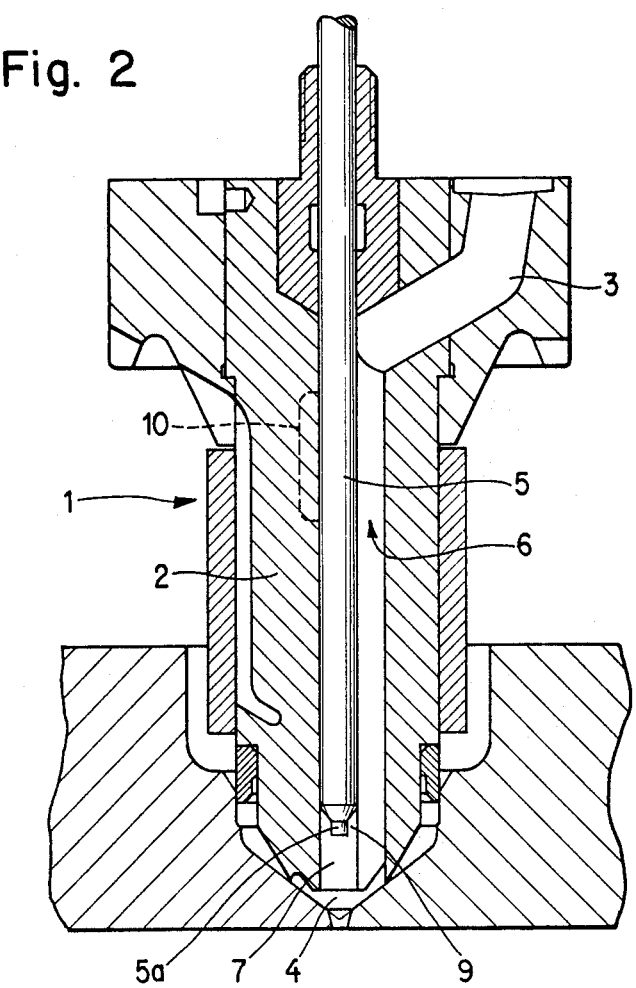

APPARATUS FOR ADMITTING HARDENABLE MATERIAL INTO THE DIES OF MOLDING MACHINES

BACKGROUND OF THE INVENTION

The invention relates to molding machines in general, and more particularly to improvements in apparatus for admitting hardenable plastic or other materials into the dies of injection molding, transfer molding and like machines. Still more particularly, the invention relates to improvements in apparatus which can be used with advantage for admission of heat- and shear-sensitive hardenable materials into the runners of molding machines.

Apparatus of the type to which the present invention pertains are disclosed, for example, in German Pat. No. 32 45 571. They are designed to ensure that the die of a molding machine can be filled with hardenable material without the development of sprue. Such apparatus comprise a housing with an inlet and an outlet for hardenable material and a needle-like valving element which is reciprocable in the housing between an extended position in which the outlet is sealed and a retracted position in which the material which is admitted by way of the inlet can flow into, through and beyond the outlet on its way into the runner of a molding machine. An important requirement which must be satisfied by apparatus of the above outlined character is to ensure that the outlet of the housing is reliably sealed in extended position of the valving element and that the valving element offers little or no resistance to the outflow of hardenable material when it is caused to assume the retracted position.

As a rule, the valving element is reciprocably mounted at the center of the housing and the inlet for admission of hardenable material is located at one side of the valving element. Such inlet admits hardenable material into a chamber which is provided in the housing and completely surrounds the valving element when the latter is caused to assume its extended position. Thus, the valving element at least partially divides the mass of hardenable material in the chamber. This creates problems when the apparatus is to receive certain types of materials which are not likely to ensure satisfactory intermixing of the divided mass in the housing when the valving element is moved to its retracted position. Consequently, different batches of the mass of hardenable material in the housing are maintained under different tension and this results in the development of pronounced boundaries between portions of the molded articles with the likelihood of development of breaks or cracks along such boundaries. Attempts to overcome the just outlined drawbacks of conventional apparatus by intensive heating of the valving element have met with limited success or with no success at all.

OBJECTS OF THE INVENTION

An object of the invention is to provide an apparatus which is constructed and assembled in such a way that the development of cracks in the molded products is prevented in a simple and efficient manner.

Another object of the invention is to provide a novel and improved housing for use in the above outlined apparatus.

A further object of the invention is to provide a novel and improved molding machine which employs the above outlined apparatus.

An additional object of the invention is to provide a novel and improved valve for admission of heat- and shear-sensitive hardenable metallic, plastic or other materials into the dies of molding machines.

Still another object of the invention is to provide the apparatus with novel and improved guide means for the valving element which controls the material discharging outlet of the housing.

A further object of the invention is to provide an apparatus which is constructed and assembled in such a way that the valving element cannot cause a pronounced division of the mass of confined hardenable material into separate batches which are not likely to become thoroughly intermixed on their way toward and beyond the outlet of the housing.

SUMMARY OF THE INVENTION

The invention is embodied in an apparatus which serves to admit hardenable metallic, plastic or other material into the die of a molding machine. The apparatus comprises a housing having an inlet for admission of hardenable material, an outlet for evacuation of hardenable material, an internal chamber which communicates with the inlet, and guide means defining an elongated passage having an end communicating with the outlet. The guide means defines a preferably elongated gap or clearance which serves to establish communication between the passage and the chamber, and the apparatus further comprises a reciprocable needle-like valving element which is disposed in the passage of the guide means and is movable with reference to the guide means between an extended or operative position in which the end of the passage is sealed from the outlet and a retracted or inoperative position in which hardenable material can flow from the chamber into the passage by way of the gap and from the end of the passage into the outlet. In accordance with a feature of the invention, the inlet and the chamber are disposed at one and the same side of the passage. If the passage is a cylindrical passage, the housing is preferably designed in such a way that its axis coincides with the axis of the passage.

The guide means can be provided with an uninterrupted guide surface for the valving element, and such guide surface is located opposite the gap.

If the valving element has a circular cross-sectional outline, the guide surface of the guide means preferably surrounds the valving element along an arc of more than 180°, preferably at least 216° but also as much as 300°.

The guide means can include at least one lip which flanks the gap, and the chamber preferably includes a portion which is adjacent the lip. The latter is located between such portion of the chamber and the gap. The gap and the lip preferably extend in the longitudinal direction of the passage.

The surface which surrounds the passage and contacts the valving element can be provided with one or more recesses to reduce the overall area of contact between the valving element and the guide means. An annular section of the guide means is designed to completely surround the valving element when the latter is caused to assume its retracted position.

The width of the gap in the circumferential direction of the valving element is less than 360°, preferably less than 180°, for example, between 60° and 90°.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

BRIEF DESCRIPTION OF THE DRAWING

FIG. 1 is an end elevational view of an apparatus which embodies one form of the invention, as seen from the bottom of FIG. 2; and FIG. 2 is an axial sectional view of the apparatus which is shown in FIG. 1.

DESCRIPTION OF PREFERRED EMBODIMENTS

The apparatus 1 which is shown in FIGS. 1 and 2 constitutes a nozzle or valve for admission of hardenable metallic, plastic or other material into the die of an injection molding, transfer molding or like machine, not shown. The apparatus 1 comprises a substantially cylindrical housing 2 having an inlet 3 for admission of hardenable material, an outlet 4 which serves to admit metered quantities of hardenable material into the runner of a die (not shown), and a chamber 6 which receives material from the inlet 3 and can admit such material into the inlet by way of an elongated passage 7 defined by a guide of the housing 2, namely by that portion of the housing which surrounds the passage 7. The apparatus 1 further comprises an elongated needle-like cylindrical valving element 5 which is reciprocable in the passage 7 between an extended or operative position in which its tip 5a seals the outlet 4 from the chamber 6 and a retracted or inoperative position in which the hardenable material is free to flow from the chamber 6 into the passage 7 and thence into and beyond the outlet 4. FIG. 2 shows the valving element 5 in retracted position.

The chamber 6 is located eccentrically of the housing 2, namely at one side of the passage 7, the same as the inlet 3. The guide of the housing 2 has an uninterrupted elongated guide surface which contacts the entire valving element 5, namely that portion of the valving element which extends into the passage 7. The passage 7 and the valving element 5 are coaxial with the housing 2. The just mentioned guide surface surrounds the peripheral surface of the cylindrical valving element 5 along an arc of more than 180°, particularly along an arc of at least 216°, 240°, 270° or 300°. It is presently preferred to select an arc of 270° to 300°. This results in the formation of an elongated clearance or gap 8 which establishes communication between the chamber 6 and the passage 7 for the flow of hardenable material from the inlet 3, through the chamber 6 and gap 8, and into and through the passage 7, its discharge end and outlet 4. When the valving element 5 assumes the retracted position of FIG. 2, hardenable material can flow from the chamber 6 through that portion of the gap 8 which is located beneath the tip 5a of the valving element and thence into the outlet 4 to be injected centrally into the die of the molding machine.

FIG. 1 shows that the gap 8 is flanked by two mirror symmetrical lips 9 of the guide for the valving element 5. The chamber 6 has two portions 6' which are adjacent the lips 9, i.e., each lip 9 is disposed between a portion 6' and the gap 7. The pressurized hardenable material which fills the chamber portions 6' biases the lips 9 against the adjacent portion of the periphery of the valving element 5. This reduces the likelihood of penetration of hardenable material between the peripheral surface of the valving element 5 and the surface bounding the passage 7.

An advantage of the improved apparatus is that it is not necessary to provide reflux paths for hardenable material because the material which is expelled from the passage 7 in response to movement of the valving element 5 to its extended or operative position can flow from the passage 7, through the gap 8 and into the chamber 6.

Another advantage of the apparatus 1 is that the elongated surface surrounding the passage 7 reduces the likelihood of flexing or other deformation of the valving element 5 during movement between extended and retracted positions. The aforediscussed feature that the guide of the housing 2 surrounds the valving element 5 along an arc of more than 180° also contributes to reliable guidance of the valving element 5 during movement between its extended and retracted positions.

A further advantage of the apparatus 1 is that the valving element 5 cannot divide the mass of hardenable material into several batches which would be unlikely to adequately mix prior to leaving the housing 2 by way of the outlet 4. This is attributable to the fact that the chamber 6 is located at one side of the passage 7 and communicates with the latter by way of an elongated gap 8. Moreover, the chamber 6 is located at the same side of the passage 7 as the inlet 3 so that the path for the flow of hardenable material from he inlet into the chamber 6 is short. When the valving element 5 is retracted, it establishes a rather large path for the flow of hardenable material from the chamber 6, through the gap 8, through the passage 7 between the tip 5a and the outlet 4, through the respective end of the passage 7 and outlet 4, and into the die of the molding machine. The material which flows from the chamber 6 into the die contacts only one side of the valving element 5 (between the lips 9), i.e., such material cannot flow all around the valving element as in conventional apparatus. This is one of the important reasons that the hardenable material in the housing 2 is not broken up or at least substantially broken up into several batches which are not likely to become fully intermixed prior to leaving the housing by way of the outlet 4.

The width of a gap which extends along an arc of less than 180° (preferably at least 60°) has been found to be sufficient to ensure satisfactory flow of hardenable material from the chamber 6, beneath the tip 5a of the valving element 5 (when the latter is maintained in retracted position) and into the passage 7 on its way toward and into the outlet 4. At the same time, the valving element 5 is reliably guided along an arc of more than 180° to prevent any bending and/or other undesirable deformation in actual use of the apparatus. Bending of the valving element 5 is further prevented by the lips 9 in cooperation with hardenable material in portions 6' of the chamber 6. The fact that the lips 9 are maintained in pronounced frictional engagement with the valving element 5 is of no consequence because such pronounced frictional engagement takes place when the valving element already assumes its retracted position. In other words, the lips 9 merely prevent penetration of hardenable material between the valving element 5 and the guide means of the housing 2 but do not oppose movements of the valving element between its extended and retracted positions.

Friction between the valving element 5 and the guide of the housing 2 can be reduced by providing the surface which surrounds the passage 7 with one or more recesses or cavities (particularly in regions other than at the lips 9). Such recesses are completely surrounded by portions of the guide surface which are immediately adjacent the peripheral surface of the valving element 5 to thus prevent penetration of hardenable material into the recesses. One such recess is indicated by broken lines, as at 10.

The uppermost portion of the guide means in the housing 2 is preferably designed in such a way that it completely surrounds the valving element 5 when the latter is moved to its retracted position. All that is necessary is to move the valving element 5 upwardly above the topmost portion of the gap 8 (as seen in FIG. 2).

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. Apparatus for admitting hardenable material into the die of a molding machine, said apparatus comprising a housing having an inlet for admission and an outlet for evacuation of hardenable material, an internal chamber communicating with said inlet, and guide means defining an elongated passage having an end communicating with said outlet, said guide means further defining an elongated gap which extends longitudinally of said passage and establishes communication between said passage and said chamber; and a reciprocable valving element disposed in said passage and movable between an extended position in which the end of said passage is sealed from said outlet and a retracted position in which hardenable material can flow from said chamber into said passage by way of said elongated gap and from the end of said passage into said outlet.

2. The apparatus of claim 1, wherein said chamber and said inlet are disposed at one side of said passage.

3. The apparatus of claim 2, wherein said passage is a cylindrical passage and said housing is coaxial with said passage.

4. The apparatus of claim 2, wherein said guide means has an uninterrupted elongated guide surface for said valving element, said guide surface being located opposite said gap.

5. The apparatus of claim 1, wherein said valving element has a circular cross-sectional outline and said guide means has a guide surface surrounding said valving element along an arc of more than 180°, particularly at least 216°.

6. The apparatus of claim 1, wherein said guide means includes at least one lip adjacent said gap.

7. The apparatus of claim 6, wherein said chamber includes a portion which is adjacent said at least one lip, said at least one lip being disposed between said portion of said chamber and said gap.

8. The apparatus of claim 7, wherein said lip extends longitudinally of said passage.

9. The apparatus of claim 1, wherein said guide means has a surface bounding said passage and contacting said valving element, and at least one recess in said surface to reduce the overall area of contact between said valving element and said guide means.

10. The apparatus of claim 1, wherein said guide means has an annular section which completely surrounds said valving element in the retracted position of said valving element.

11. The apparatus of claim 1, wherein said gap extends circumferentially of said valving element along an arc of less than 180°.

12. The apparatus of claim 1, wherein said housing includes a one-piece portion which defines said chamber and includes said guide means.

13. The apparatus of claim 1, wherein said chamber has a substantially crescent-shaped cross-sectional outline.

* * * * *